US012651063B2

(12) United States Patent
Moore et al.

(10) Patent No.: US 12,651,063 B2
(45) Date of Patent: Jun. 9, 2026

(54) OBTAINING IMMUTABLE SNAPSHOTS IN STORAGE SYSTEMS FOR RECOVERY AFTER CORRUPTED DATA DETECTION

(71) Applicant: International Business Machines Corporation, Armonk, NY (US)

(72) Inventors: Roderick Guy Charles Moore, Bournemouth (GB); Florent C. Rostagni, Eastleigh (GB); Paul Nicholas Cashman, Alton (GB); Lee Jason Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 18/413,174

(22) Filed: Jan. 16, 2024

(65) Prior Publication Data

US 2025/0190562 A1     Jun. 12, 2025

(30) Foreign Application Priority Data

Dec. 12, 2023     (GB) ...................................... 2318936

(51) Int. Cl.
*G06F 21/56*        (2013.01)
*G06F 21/55*        (2013.01)
(52) U.S. Cl.
CPC .......... *G06F 21/566* (2013.01); *G06F 21/554* (2013.01); *G06F 21/568* (2013.01)
(58) Field of Classification Search
CPC .... G06F 21/566; G06F 21/554; G06F 21/568; G06F 11/1448; G06F 11/073; G06F 21/56; G06F 2201/84
See application file for complete search history.

(56) References Cited

U.S. PATENT DOCUMENTS

| | | | |
|---|---|---|---|
| 7,590,813 B1 | 9/2009 | Szor | |
| 8,943,282 B1 | 1/2015 | Armangau et al. | |
| 9,009,355 B1 | 4/2015 | Jan et al. | |
| 11,030,314 B2 | 6/2021 | Kucherov | |
| 11,336,685 B1 | 5/2022 | Rodriguez | |
| 11,372,976 B2 | 6/2022 | Yoshii | |
| 12,235,961 B1 * | 2/2025 | Davies .................. | G06F 21/568 |
| 2021/0303511 A1 * | 9/2021 | Karr .................... | G06F 16/1824 |
| 2022/0027472 A1 | 1/2022 | Golden | |

(Continued)

OTHER PUBLICATIONS

Cloud Duplicate Finder, https://www.cloudduplicatefinder.com/ <Retrieved Dec. 19, 2023>.

(Continued)

*Primary Examiner* — Ali S Abyaneh

(74) *Attorney, Agent, or Firm* — Seed Intellectual Property Law Group LLP

(57) ABSTRACT

Obtaining immutable snapshots in storage systems for recovery after corrupted data detection. The method includes triggering an immutable snapshot without forcing an active storage write cache to flush so that active write cache data is not contained in the snapshot. The method includes analyzing current active writes in the write cache to identify compromised writes. Triggering the immutable snapshot may be in response to detection of a corrupted data risk and may be in addition to scheduled immutable snapshots or at the time of scheduled immutable snapshots.

20 Claims, 5 Drawing Sheets

(56) References Cited

U.S. PATENT DOCUMENTS

2022/0374519 A1    11/2022    Botelho

OTHER PUBLICATIONS

United Kingdom Search Report, Application No. GB2318936.8, Jun. 19, 2024, 3 pgs.
Nauman Lodhi, "Top 5 Cloud Duplicate Finder Solutions", https://dzone.com/articles/top-5-cloud-duplicate-finder-solutions, Nov. 7, 2019, 8 pages.
No Author, "Git diff", https://web.archive.org/web/20230923144959/https://www.atlassian.com/git/tutorials/saving-changes/git-diff, Sep. 23, 2023, 13 pages.

* cited by examiner

250

400 —

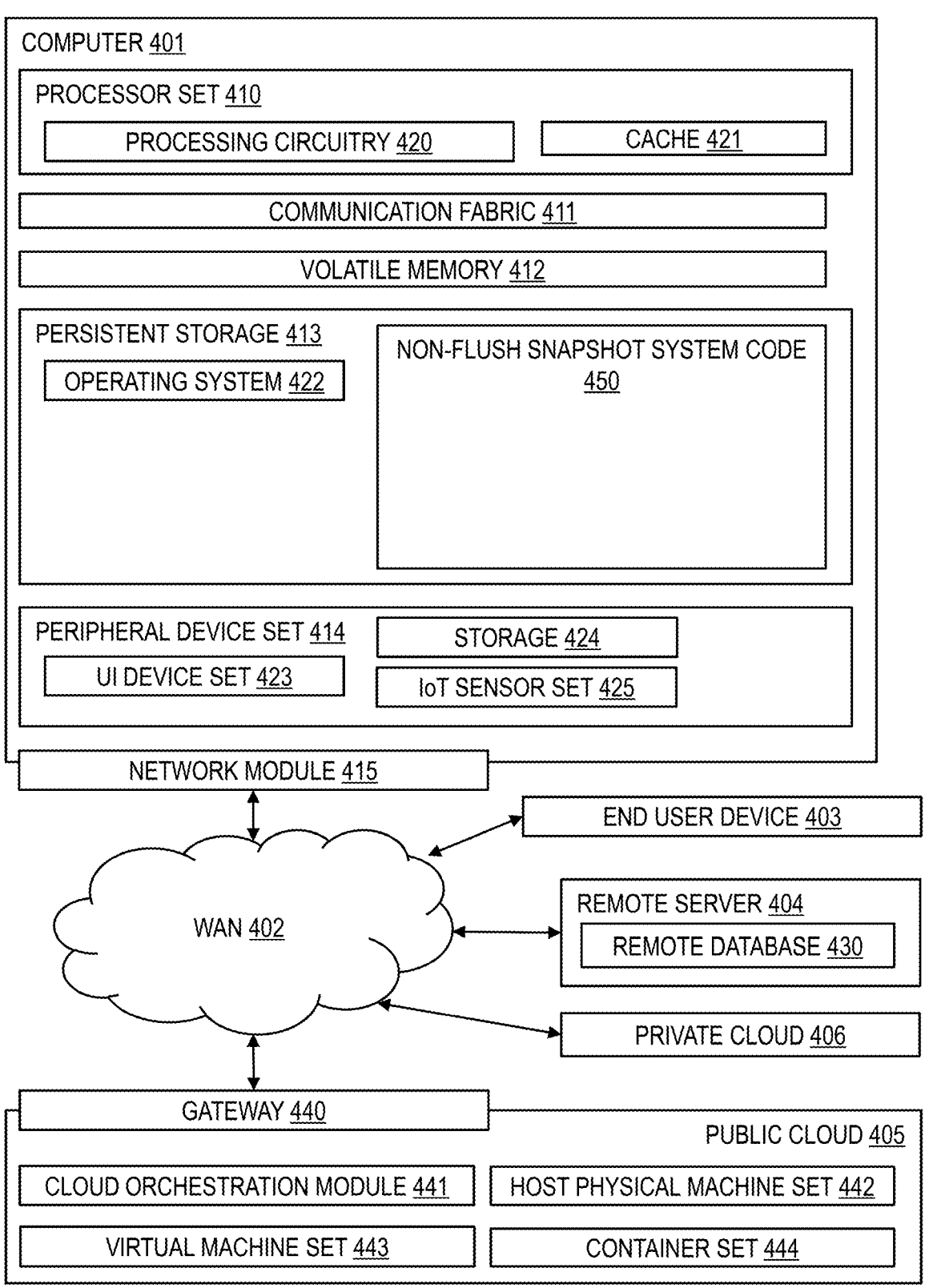

COMPUTER 401

PROCESSOR SET 410

PROCESSING CIRCUITRY 420    CACHE 421

COMMUNICATION FABRIC 411

VOLATILE MEMORY 412

PERSISTENT STORAGE 413

OPERATING SYSTEM 422

NON-FLUSH SNAPSHOT SYSTEM CODE 450

PERIPHERAL DEVICE SET 414

UI DEVICE SET 423

STORAGE 424

IoT SENSOR SET 425

NETWORK MODULE 415

WAN 402

END USER DEVICE 403

REMOTE SERVER 404

REMOTE DATABASE 430

PRIVATE CLOUD 406

GATEWAY 440

PUBLIC CLOUD 405

CLOUD ORCHESTRATION MODULE 441

HOST PHYSICAL MACHINE SET 442

VIRTUAL MACHINE SET 443

CONTAINER SET 444

*FIG. 4*

OBTAINING IMMUTABLE SNAPSHOTS IN STORAGE SYSTEMS FOR RECOVERY AFTER CORRUPTED DATA DETECTION

BACKGROUND

The present invention relates to storage system recovery after detection corrupted data, and more specifically, to obtaining immutable snapshots in storage systems for the recovery.

Corrupted data may be detected in storage systems due to malicious attacks that may take a range for forms including malware, malicious attack, and other forms of attack. For example, malicious attack attacks are becoming a common method used by attackers to exploit system users to extract money from companies that store large amounts of data. Often a significant amount of data has already been encrypted by the attackers before the users and system administrators discover a malicious attack.

Malicious attack detection software is available that analyzes files in a manner similar to virus scanners and checks for signatures of attacks such as file encryption, file changes over times, compression statistics, etc. IBM Spectrum Sentinel (IBM and Spectrum Sentinel are trademarks of International Business Machines Corporation) is a tool that is designed to detect malicious attacks such as malicious attack.

Storage systems provide a feature of immutable snapshots (safeguarded copy) that can be scheduled periodically to give a read only point-in-time copy of data. These copies are used by malicious attack detection systems as the input data to analyze and monitor the risk of malicious attack. The storage systems also provide immutable point-in-time backup for recovery if a malicious attack is detected.

Real time statistics of the data stored by storage systems is also collected and analyzed by malicious attack detection systems including statistics such as read/write rates, compression rate, and Shannon Entropy of data. For example, for malicious attack detection the Shannon Entropy is useful as a measure of randomness and can help distinguish between strong encryption, weak encryption, and no encryption. A host compromised by encrypting malicious attack is expected to write encrypted data with high entropy compared to a host running a regular application.

When a point-in-time copy is made, the inflight data that is in cache is flushed to disk. Any subsequent writes after the copy is triggered can again be cached, but by flushing the existing cache, the data written to disk and saved is consistent at the time the copy was requested. In modern systems, the cache could be many gigabytes of data, depending on cache architecture and method of ensuring non-volatility of the write cache. The write cache in systems is also likely to increase in size with new non-volatile memory architecture.

SUMMARY

According to an aspect of the present invention there is provided a computer-implemented method for obtaining immutable snapshots in storage systems for recovery after corrupted data detection, said method comprising: triggering an immutable snapshot without forcing an active storage write cache to flush so that active write cache data is not contained in the snapshot; and analyzing current active writes in the write cache at the time of the triggered immutable snapshot to identify compromised writes.

This has the advantage that taking a non-flush snapshot without cache content that provides the best chance to have uncompromised data available in the snapshot. The snapshot may not be self-consistent due to the writes that may or may not be in cache. However, if there is a large write cache then any inflight corrupted data writes may be still in cache and as yet not written to disk.

Triggering an immutable snapshot may be in response to detection of a corrupted data risk. This has the advantage of generating a snapshot without cache content at the time of corruption being detected.

The method may include, once the triggered immutable snapshot has been generated, forcing a flush of the active storage write cache and taking a subsequent immutable snapshot with the active storage write cache flushed.

The subsequent snapshot may have more compromised data as the writes were flushed to disk but may have some of the customer write data that was inflight but not compromised.

Analyzing current active writes may force a cache layer to analyze the current active writes. The method may include updating any writes found in the active storage write cache in the immutable snapshot by reading physical storage bypassing current write cache data, allowing the immutable snapshot to be read without potentially corrupted data.

According to another aspect of the present invention there is provided a system for obtaining immutable snapshots in storage systems for recovery after corrupted data detection, comprising: a processor and a memory configured to provide computer program instructions to the processor to execute the function of the components: a snapshot triggering component for triggering an immutable snapshot including a flush prevention component for preventing an active storage write cache flush so that active write cache data is not contained in the snapshot; and a write cache analyzing component for analyzing current active writes in the write cache at the time of the triggered immutable snapshot to identify compromised writes.

According to a further aspect of the present invention there is provided a computer program product for obtaining immutable snapshots in storage systems for recovery after corrupted data detection, the computer program product comprising a computer readable storage medium having program instructions embodied therewith, the program instructions executable by a processor to cause the processor to: trigger an immutable snapshot without forcing an active storage write cache to flush so that active write cache data is not contained in the snapshot; and analyze current active writes in the write cache at the time of the triggered immutable snapshot to identify compromised writes.

BRIEF DESCRIPTION OF THE DRAWINGS

Embodiments of the present invention will now be described, by way of example only, with reference to the accompanying drawings:

FIG. 4 is a block diagram of an example embodiment of a computing environment for the execution of at least some of the computer code involved in performing the present invention.

Figure 1:
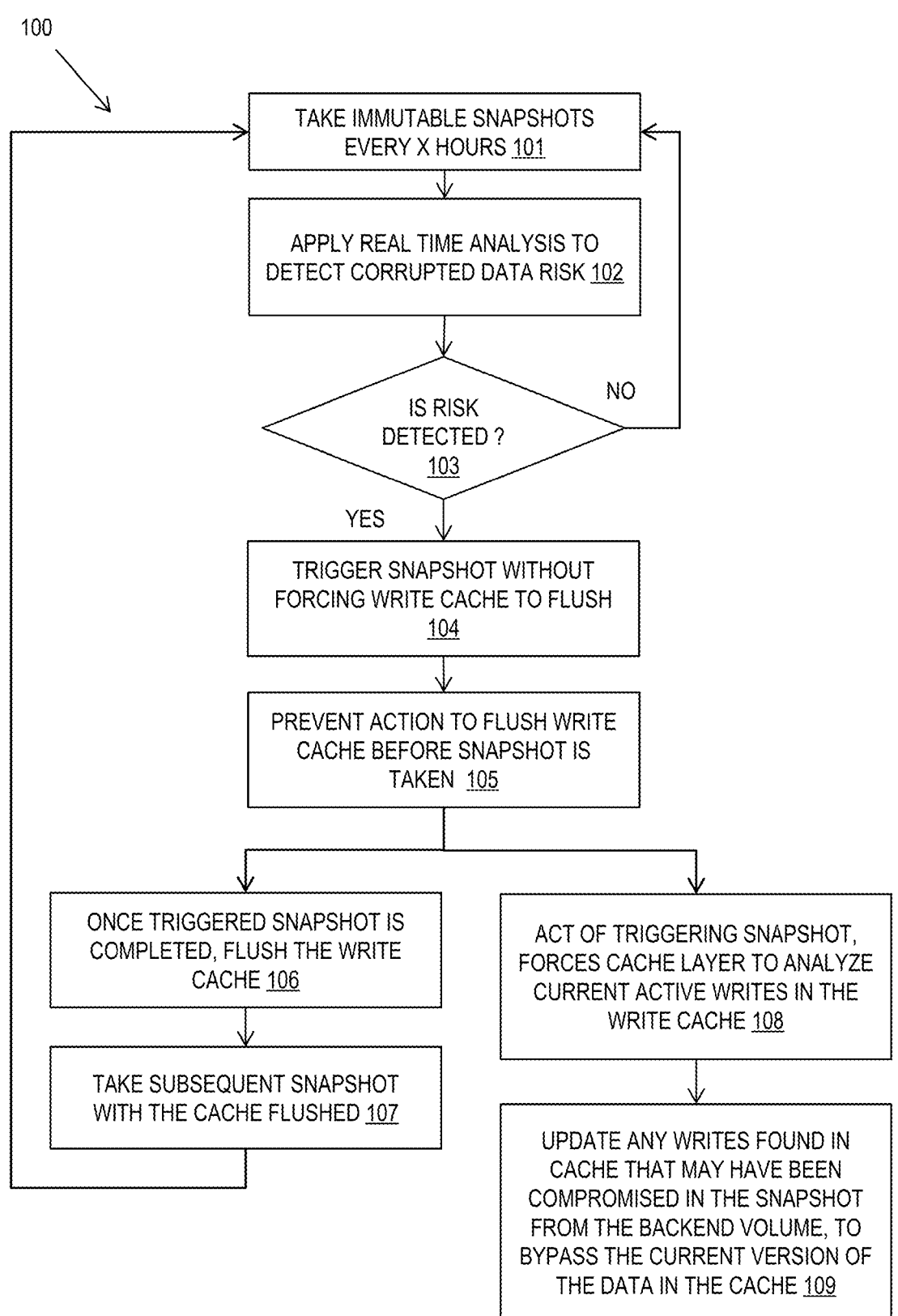
FIG. 1 is a flow diagram of an example embodiment of a method in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for obtaining immutable snapshots in storage systems for recovery after detection of a risk of compromised data. The described method triggers an immutable snapshot without forcing an active storage write cache to flush so that active write cache data is not contained in the snapshot. The method then analyzes current active writes in the write cache to identify compromised writes.

Immutable snapshots create point-in-time copies of data that cannot be modified or tampered with. Immutable snapshots are used to give a read only point-in-time copy of data that is used by as input for analysis of risk detection. The immutable snapshots also provide immutable point-in-time backup for recovery. Immutable snapshots may be referred to as safeguarded copies.

In storage systems, immutable snapshots are scheduled periodically to give a read only point-in-time copy of data as input data for analysis in malicious attack detection. Conventionally, when immutable snapshots are made, inflight data in an active write cache is flushed to and written to disk so that data written is consistent at the time that the snapshot was taken.

The described method and system prevent a write cache flushing when a risk of compromised data is detected and an immutable snapshot without cache flush is triggered and obtained. The immutable snapshot may be at a scheduled time or may be triggered as an intermediate snapshot additional to scheduled immutable snapshots.

A risk of compromised data may be checked and detected routinely before a scheduled snapshot issues a flush. For example, this may include a check to determine if the entropy is good. If a risk of compromised data found, the method may trigger a snapshot without cache flush so that there exists a snapshot without the current write cache content. This may be followed by a snapshot with cache flush.

A risk of compromised data may be detected by a malicious attack detection system either internal or external to the storage system and this detection may trigger an immutable snapshot without a cache flush either at a scheduled time or as an additional snapshot. The triggering of the immutable snapshot additionally to the normal snapshot schedule as driven by detection of a potential malicious attack would enable snapshots to be captured that contain potentially less corrupt data.

When a risk of compromised data is found on a volume, then a snapshot is triggered without flushing the write cache. Once this intermediate snapshot has been generated, a subsequent snapshot can be taken that does force the write cache flush. The subsequent snapshot will include the potential data corruption from the cache.

The triggered snapshot may not be self-consistent due to the writes that may or may not be in cache. However, if there is a large write cache then any inflight corrupted writes may be still in cache and as yet not written to disk. By taking the triggered, non-flushed snapshot, this gives the best chance to have uncompromised data available in the snapshot.

Triggering an immutable snapshot as an intermediate snapshot as soon as a suspected corrupted data is detected with the exclusion of data of the active storage controller write cache allows for a snapshot to be generated with the potential that it does not contain the corrupt data. The snapshot may not be self-consistent as the active write cache is not flushed but it will have less corruption as any compromised writes that are in the write cache are not committed to disk. If the corrupted data detection is timely enough, then the active write cache data has more chance of being the source of the corrupt data and as such removing this from a snapshot may provide a snapshot that is closer to the good data before the corrupted writes occurred.

The obtaining of immutable snapshots in storage system is an improvement in the technical field of computer storage generally and more particularly in the technical field of security and backup of storage data.

Referring to FIG. 1, a flow diagram 100 shows an example embodiment of the described method. The method is carried out for a storage system in which a corrupted data detection system is applied. In an example embodiment, the corrupted data detection system may be a malicious attack detection system. The storage system includes a write cache wherein data is written to the cache and then the data is later written to disk providing greater data integrity and improved performance.

The method may be configured to take 101 immutable snapshots of data in a volume of the storage system at intervals, for example, at regular intervals every N hours. The frequency of the intervals is configured to be suitable for the user's recovery point objective. Real time analysis 102 of the storage system is carried out to detect a corrupted data risk including in the pause time between immutable snapshots. The corrupted data detection system may use various detection techniques that are generated as data is written into cache or above the write cache layer by other components in the storage system. The detection techniques may include, for example, compression statistics and entropy measurement.

It is determined 103 if a risk of corrupted data is detected. If no risk is detected, the method may loop to continue with the scheduled immutable snapshots 101 at intervals. If a risk of corrupted data is detected, then a snapshot is immediately triggered 104 without forcing the write cache to be flushed. This may include preventing 105 a usual action to flush the write cache before a snapshot is generated.

Once the triggered immutable snapshot is generated, the write cache is flushed 106 and a subsequent snapshot is taken 107 with the cache flushed. This subsequent snapshot may be taken immediately once the triggered immutable snapshot is generated or may be taken at the next scheduled snapshot time. The first triggered snapshot is possibly not self-consistent (as the cache was not flushed) but it may have less corruption as any compromised writes that were in the write cache were not committed to disk. The subsequent snapshot may have more compromised data as the writes were flushed to disk but may have some of the customer write data that was inflight but not compromised. The method may then loop to continue to take 101 the scheduled snapshots.

The act of triggering this intermediate snapshot forces the cache layer to analyze 108 the current active writes in the write cache. Any writes found in the cache are updated 109 in the snapshot from the backend volume bypassing the current version of the data in the cache. Any writes found in cache may force a read from the backend volume to get the last "good" data that can then be written to the intermediate snapshot. This replaces the copy-on-write operation of a normal snapshot. This grain would then be split to make sure the volume reads do not read the corrupted source volume. This allows the snapshot to get the last data that was flushed to disk and ignore the current version of the "bad" data in the write cache.

The triggered intermediate snapshots can be triggered independently of a snapshot scheduler and allow data to be reconstructed closer to the point of corruption. The subsequent snapshot may behave as normal and would contain the potentially compromised data that was found in the write cache and then flushed.

Providing additional triggered snapshots available for a customer to read and check for valid data reduces the window of impact to less than the N hours defined by the snapshot schedule.

The real time analysis and triggering of the additional snapshots may be controlled by the storage server itself or by external software, such as storage insights, analyzing the statistics reported by the storage controller.

Triggering an intermediate snapshot with the removal of the active storage controller write cache allows for a snapshot to be generated with the potential that it does not contain the corrupt data. Being able to remove the active write cache from the snapshot enables a snapshot to be generated that does not contain active written data that has yet to be destaged. If the malicious attack detection is timely enough then the active write cache data has more chance of being the source of the corrupt data and as such removing this from a snapshot could provide a snapshot that is closer to the good data before the corrupted writes occurred.

Figure 2A:
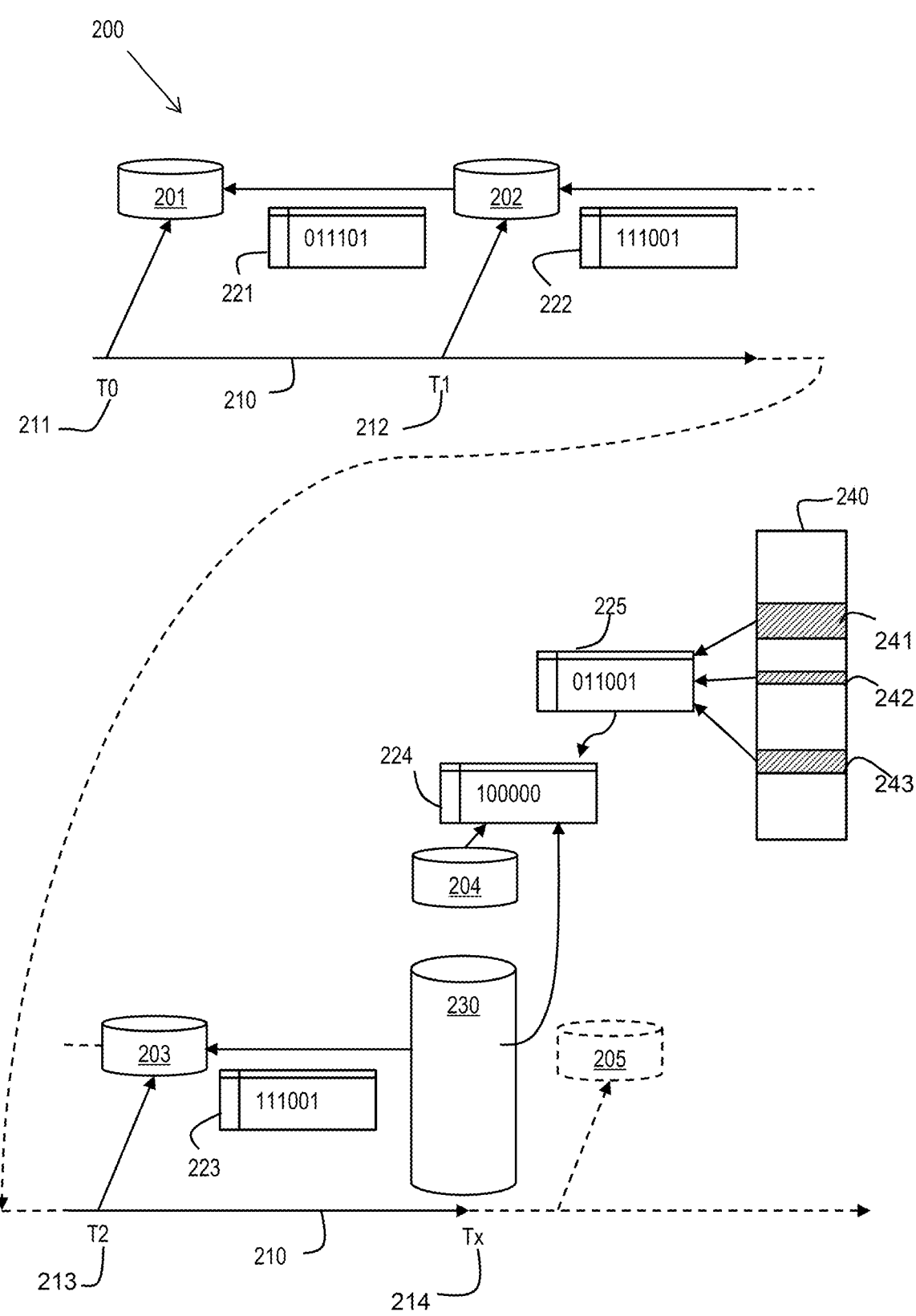
FIGS. 2A and 2B are schematic diagrams illustrating a method in accordance with embodiments of the present invention.
Figure 2B:
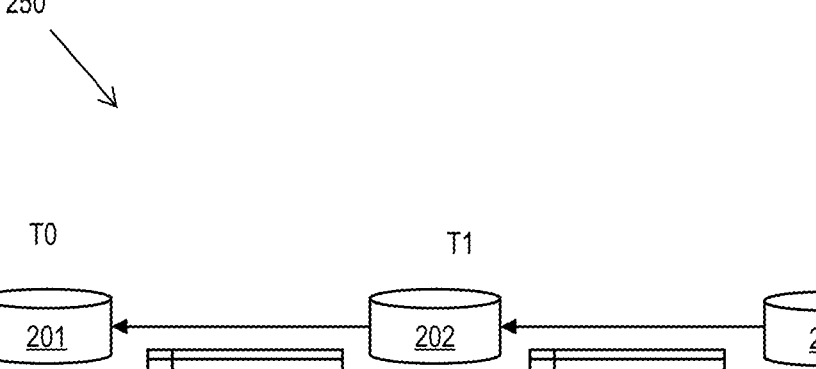
Figure 2B:
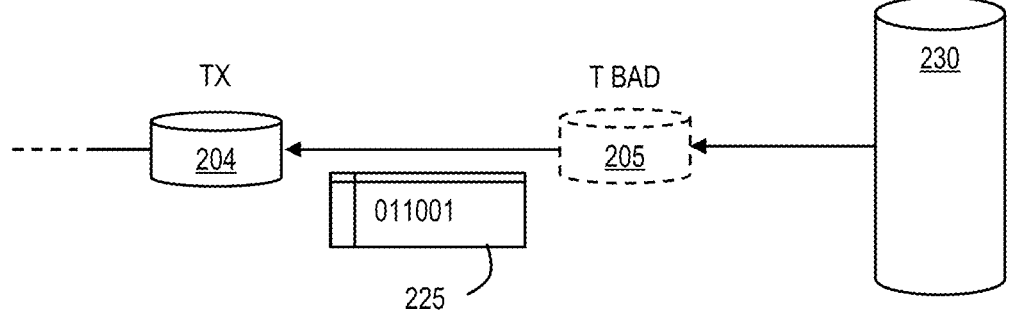

FIGS. 2A and 2B are schematic diagrams 200, 250 illustrating the method. The method uses detection of corruption to lead to the generation of an intermediate snapshot with the current write cache contents removed.

In FIG. 2A, a timeline 210 is provided with scheduled snapshots 201, 202, 203 of a source volume 230 shown at intervals T0 211, T1 212, T2 213. A bitmap 221, 222, 223 for each snapshot 201, 202, 203 is shown.

A detection of data as compromised in the source volume 230 may be found at time Tx 214 triggering an immediate snapshot 204 as an intermediate snapshot additional to the scheduled snapshots. The triggered snapshot 204 is generated without flushing an active write cache 240. The write cache 240 may contain potentially compromised data 241, 242, 243 yet to be destaged to the backend storage.

The bitmap 224 of the triggered snapshot 204 without writes that are resident in the write cache 240 and will not include potentially compromised writes of the write cache 240. The bitmap 225 of a subsequent snapshot 205 once the write cache 240 is flushed will include the potentially compromised writes 241, 242, 243 of the write cache 240.

FIG. 2B shows a graph 250 of the order of the snapshots 201-205 and bitmaps 221, 222, 224, 225 showing the triggered intermediate snapshot 204 added to the graph. The triggered intermediate snapshot 204 at time Tx 214 is generated without write cache 240 content at time of corruption being detected.

The intermediate snapshot does not only need to be triggered by external corrupt data detection or malicious attack detection. An intermediate snapshot may be implemented such that before any snapshot issues a flush, the method checks whether the data is corrupt, for example, if the entropy is suspect. If it is found to be suspect, the method may trigger a snapshot without flush, then snapshot with flush so that there exists a snapshot without the current write cache content.

Figure 3:
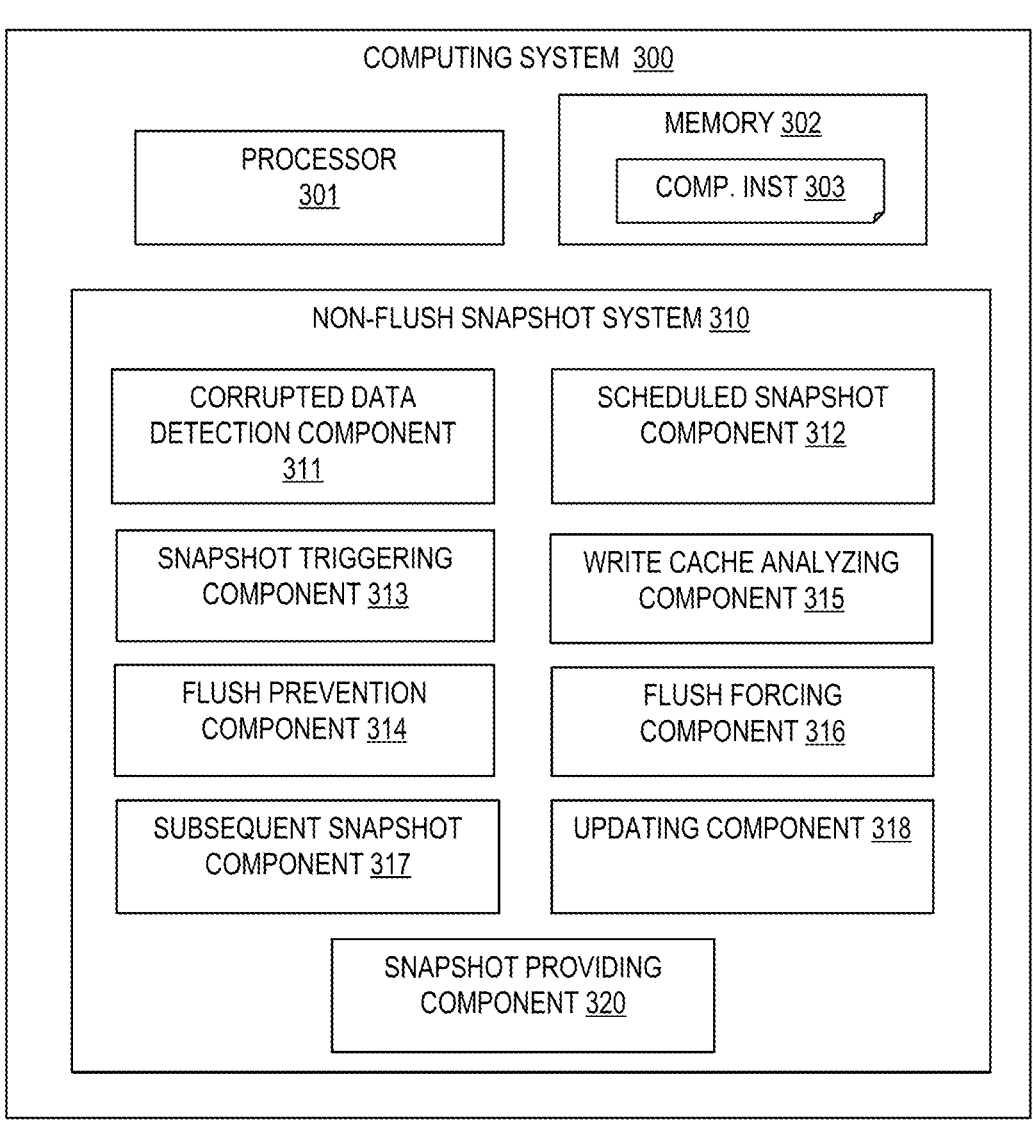
FIG. 3 is a block diagram of an example embodiment of a system in accordance with embodiments of the present invention.
Figure 3:
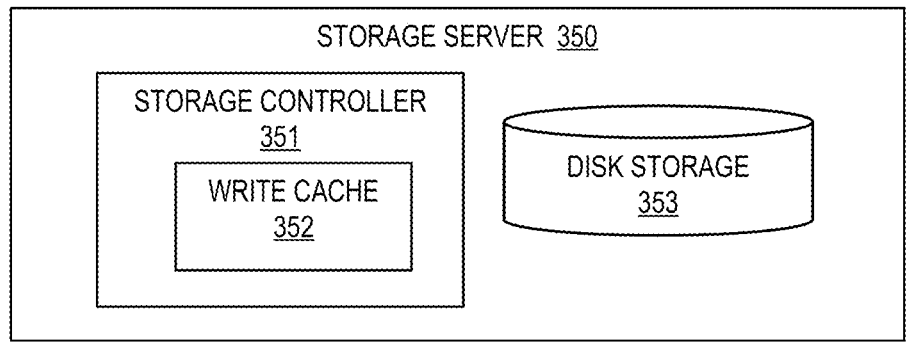

Referring to FIG. 3, a block diagram shows a computing system 300 in which the described non-flush snapshot system 310 may be implemented. The computing system 300 includes at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

A storage server 350 may be provided including a storage controller 351 at which the snapshots are generated and including a write cache 352 and disk storage 353. The non-flush snapshot system 310 may be provided in a storage server 350 or may be external to a storage server.

The non-flush snapshot system 310 may be associated with or include a corrupted data detection component 311. The corrupted data detection component 311 may be or may be associated with a malicious attack detection component for detection of a malicious attack risk. The non-flush snapshot system 310 may be associated with or include a scheduled snapshot component 312 for generating regular scheduled immutable snapshots.

The non-flush snapshot system 310 includes a snapshot triggering component 313 for triggering an immutable snapshot. The non-flush snapshot system 310 includes a flush prevention component 314 for preventing an active storage write cache flush so that active write cache data is not contained in the snapshot. The non-flush snapshot system 310 includes a write cache analyzing component 315 for analyzing current active writes in the write cache to identify compromised writes at the time of the triggered immutable snapshot. The write cache analyzing component 315 may force a cache layer to analyze the current active writes.

The snapshot triggering component 313 may cooperate with the corrupted data detection component 311 for triggering the immutable snapshot upon detection of a corrupted data risk. The snapshot triggering component 313 may trigger the immutable snapshot as an intermediate snapshot in a period of regular scheduled immutable snapshots or immediately prior to a scheduled snapshot.

The non-flush snapshot system 310 may include a flush forcing component 316 for, once the triggered immutable snapshot is generated, forcing a flush of the active storage write cache.

The non-flush snapshot system 310 may include a subsequent snapshot component 317 for taking a subsequent immutable snapshot with the active storage write cache flushed.

The non-flush snapshot system 310 may include an updating component 318 for updating any writes found in the active storage write cache in the immutable snapshot that may have been compromised and instead read last data written to disk to bypass the compromised data in the write cache.

The non-flush snapshot system 310 may include a snapshot providing component 320 for providing the triggered immutable snapshot for a user to read and check for valid data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 4, computing environment 400 contains an example of an environment for the execution of at least some of the computer code involved in performing the inventive methods, such as non-flush snapshot system code 450. In addition to block 450, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 450, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 450 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 450 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for obtaining immutable snapshots in storage systems for recovery after corrupted data detection, said method comprising:
   triggering an immutable snapshot without forcing an active storage write cache to flush, wherein the immutable snapshot does not contain active storage write cache data;
   analyzing current active writes in the active storage write cache at the time of the triggered immutable snapshot to identify compromised writes; and
   updating the compromised writes identified in the active storage write cache in the immutable snapshot with data read from physical storage, bypassing the active storage write cache data.

2. The method of claim 1, wherein triggering the immutable snapshot is in response to detection of a corrupted data risk.

3. The method of claim 2, wherein the detection of the corrupted data risk is detected by a malicious attack detection system.

4. The method of claim 1, wherein triggering the immutable snapshot is an intermediate snapshot in a period of regular scheduled immutable snapshots or is a scheduled immutable snapshot.

5. The method of claim 1, further comprising:
   once the triggered immutable snapshot has been generated, forcing a flush of the active storage write cache; and
   taking a subsequent immutable snapshot with the active storage write cache flushed.

6. The method of claim 1, wherein analyzing current active writes forces a cache layer to analyze the current active writes.

7. The method of claim 1, further comprising:
   providing the triggered immutable snapshot for a user to read and check for valid data.

8. The method of claim 1, further comprising:
   controlling the triggering of the immutable snapshot and real time analysis by a storage server or by external software.

9. A system for obtaining immutable snapshots in storage systems for recovery after corrupted data detection, comprising:
   a processor; and
   a memory configured to provide computer program instructions to the processor to:
   trigger, by a snapshot triggering component, an immutable snapshot including a flush prevention component for preventing an active storage write cache flush, wherein the immutable snapshot does not contain active write cache data;
   analyze, by a write cache analyzing component, current active writes in the active storage write cache at the time of the triggered immutable snapshot to identify compromised writes; and
   update, by an updating component, the compromised writes identified in the active storage write cache in the immutable snapshot with data read from physical storage, bypassing the active storage write cache data.

10. The system of claim 9, wherein the computer program instructions further cause the processor to:
   detect, by a corrupted data detection component, a corrupted data risk and cooperate with the snapshot triggering component to trigger the immutable snapshot.

11. The system of claim 10, wherein the corrupted data detection component is part of a malicious attack detection system.

12. The system of claim 9, wherein the computer program instructions further cause the processor to:
   generate, by a scheduled snapshot component, regular scheduled imputable snapshots, and
   wherein the snapshot triggering component triggers the immutable snapshot as an intermediate snapshot in a period of regular scheduled immutable snapshots or is a scheduled immutable snapshot.

13. The system of claim 9, wherein the computer program instructions further cause the processor to:
   force, by a flush forcing component, a flush of the active storage write cache once the triggered immutable snapshot has been generated; and
   take, by a subsequent snapshot component, a subsequent immutable snapshot with the active storage write cache flushed.

14. The system of claim 9, wherein the write cache analyzing component forces a cache layer to analyze the current active writes.

15. The system of claim 9, wherein the computer program instructions further cause the processor to:
   provide, by a snapshot providing component, the triggered immutable snapshot for a user to read and check for valid data.

16. The system of claim 9, further comprising:

a storage server including a non-flush snapshot system including the snapshot triggering component and the write cache analyzing component.

17. The system of claim 9, further comprising:

a malicious attack detection snapshot system external to a storage server, the malicious attack detection snapshot system including the snapshot triggering component for triggering of the immutable snapshot.

18. A computer readable storage medium comprising computer executable instructions that, when executed by at least one computing device, cause the at least one computing device to:

trigger an immutable snapshot without forcing an active storage write cache to flush, wherein the immutable snapshot does not contain active write cache data;

analyze current active writes in the write cache at the time of the triggered immutable snapshot to identify compromised writes; and update the compromised writes identified in the active storage write cache in the immutable snapshot with data read from physical storage, bypassing the active storage write cache data.

19. The computer readable storage medium of claim 18, wherein the computer executable instructions further cause the at least one computing device to: detect a corrupted data risk and, upon the detection of the corrupted data risk, trigger the immutable snapshot.

20. The computer readable storage medium of claim 18, wherein the computer executable instructions further cause the at least one computing device to:

once the triggered immutable snapshot has been generated, force a flush of the active storage write cache; and take a subsequent immutable snapshot with the active storage write cache flushed.

* * * * *